Patented Apr. 29, 1930

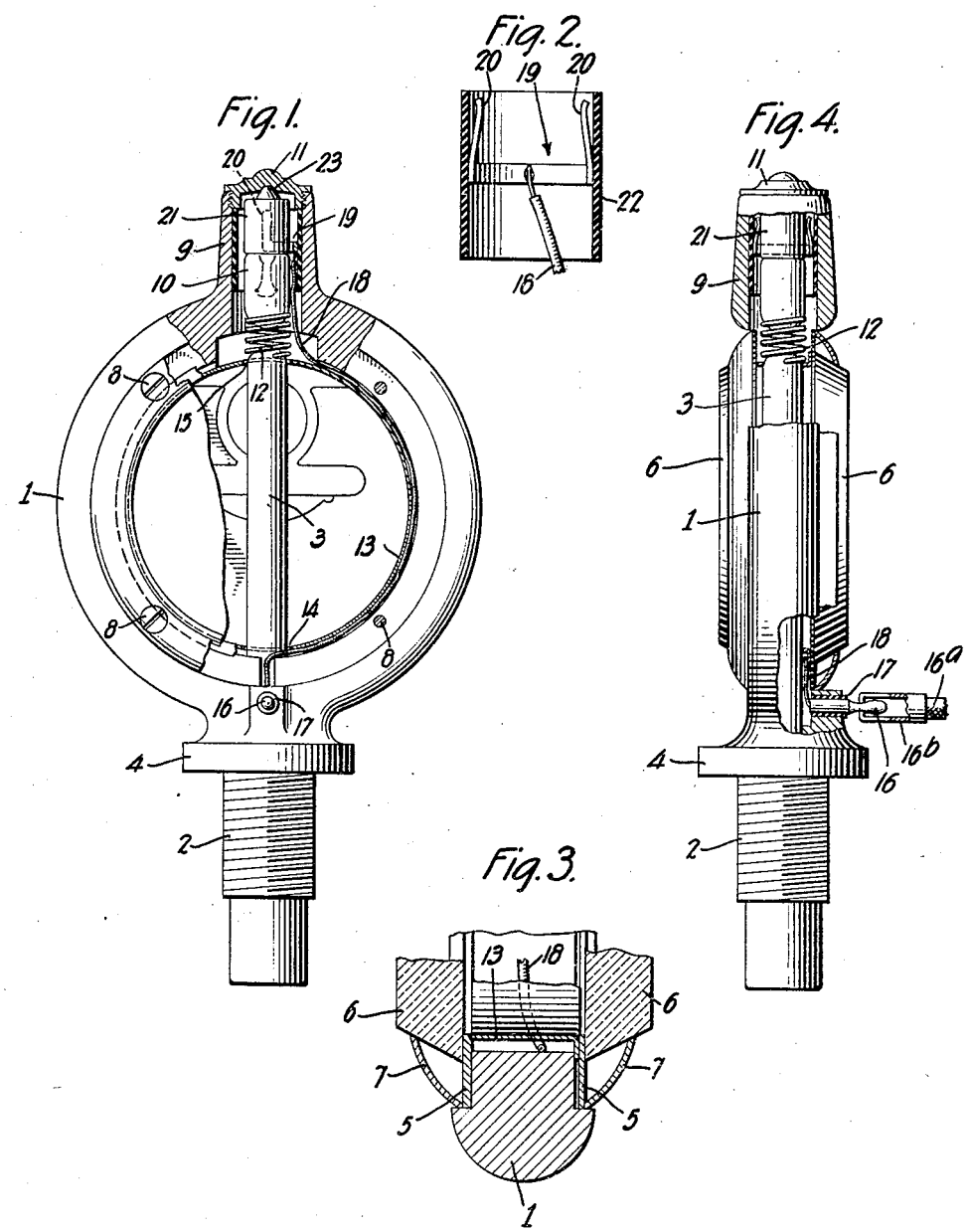

1,756,070

UNITED STATES PATENT OFFICE

ALFRED B. SCHUPP, OF RICHMOND HILL, NEW YORK, ASSIGNOR, BY MESNE ASSIGNMENTS, TO MOTO METER GAUGE & EQUIPMENT CORPORATION, OF LONG ISLAND CITY, NEW YORK, A CORPORATION OF DELAWARE

MOTOR HEAT INDICATOR

Application filed July 26, 1928. Serial No. 295,381.

This invention relates to motor heat indicating means, and has to do particularly with heat indicators adapted to be mounted on radiator caps of motor vehicles in view of the driver for warning the driver of conditions dangerous to continued operation.

It is an object of the invention to provide in an instrument of this character means for illuminating the indicator element and for rendering it conspicuous.

To these ends provision is desirably made of an instrument comprising a thermometer stem, a dial, a casing for the stem and dial, and illuminating means concealed in the casing and so arranged that the light from the source of illumination is directed longitudinally of the thermometer stem, and is caused to escape from the casing principally through the thermometer stem. By this means the thermometer stem is caused to become the apparent source of illumination, and to radiate a subdued light which makes the instrument conspicuous and easy to read without producing an objectionable glare.

Other objects and advantages will hereinafter appear.

In the drawings forming part of this specification:

Figure 1 is a front elevation, partly in section, of an instrument embodying features of the invention;

Figure 2 is a vertical, sectional, detail view of an insulating terminal carrying sleeve employed in the embodiment of Figure 1;

Figure 3 is a fragmentary, detail view of the casing assembly; and

Figure 4 is a side elevation, partly in section, and partly broken away, of the instrument illustrated in Figure 1.

The illustrative instrument may be of the type of the Boyce MotoMeter, and comprises a generally circular casing 1 and a threaded stem 2. A thermometer tube 3 containing a suitable colored indicating liquid is mounted in the casing and stem with the bulb portion of the tube situated in the lower part of the stem and the stem portion of the tube situated in an opening in the casing. The casing 1 terminates at its lower extremity in a circular base member 4 adapted to rest upon the cap of an automobile radiator. The instrument is secured upon the cap by passing the threaded stem 2 through an opening in the cap and clamping it in place by means of suitable clamping washers and nuts (not shown).

The casing 1 is provided with annular rabbets in the front and rear faces thereof which support packing rings 5. Cover glasses 6 are positioned over the packing rings, and retaining rings 7 are mounted to overlie the beveled edges of the cover glasses and hold them in place, the retaining rings being secured to the casing by suitable screws 8.

When installed as described, the bulb portion of the thermometer is exposed to the temperature of the usual air space in the upper part of the radiator and the stem or indicating part of the thermometer stem 3 projects outside the radiator and is visible to the driver from the driver's seat.

The principal purpose of the present invention is to facilitate the reading of the indications given by the thermometer under all conditions of light and darkness, and particularly at night when natural illumination does not suffice.

The instrument comprises a suitable dial, mounted to form a background for the thermometer stem, this dial being secured between the packing ring and the cover glass which are normally remote from the driver of the vehicle.

The form of the dial constitutes a feature of the present invention. For the purpose of admitting the greatest possible amount of natural light to the thermometer stem and thereby minimizing the necessity for artificial illumination, the dial plate is skeletonized, as shown, all portions being omitted except such as are necessary for supporting the dial and for cooperating with the thermometer stem to advise the driver of the significance of the movement of the thermometer liquid.

For the purpose of providing artificial illumination for the thermometer stem, provision is made of a hollow boss 9 at the top of the casing 1, and an electric lamp 10 is mounted within the box. The lamp is insertable into the boss through an opening in the top thereof, and is adapted to have its center terminal contacted by a threaded closure plug 11 that is screwed into the boss for holding the lamp in place. The lamp is supported in alignment with the thermometer stem and is pressed upward against the closure 11 by a coil spring 12 that surrounds the upper tip of the thermometer stem and the lower tip of the lamp bulb. This spring is effective to maintain a good electrical connection between the center terminal of the lamp and the closure 11 and also to prevent vibration of the lamp, and to maintain alignment of the lamp and the thermometer stem. A flanged ring 13 is mounted within the casing 1, being spaced inward a short distance from the casing to provide an annular space between the casing and the ring. This ring is provided with a lower opening 14 and an upper opening 15, which openings receive and substantially fit the thermometer stem. The upper opening 15 prevents escape of any substantial amount of light from the casing, except such rays as are projected vertically downward and pass through the thermometer stem. The marginal portion of the ring bordering upon the upper opening 15 serves as a support for the spring 12. The lighting device, mounted as described, is effective both to render the thermometer stem conspicuous and to illuminate it so that it may be read.

Current may be conducted to the lamp 10 through a suitable battery conductor 16ª provided with a terminal clip or socket 16ᵇ. Provision is made of a lead-in terminal 16 at the bottom of the casing adapted for detachable connection to such socket 16ᵇ. The terminal 16 is mounted in an insulating sleeve 17 and is connected through a conductor 18 which passes through the annular space between the ring 13 and the casing 1 to the upper part of the casing. The conductor 18 is connected at its upper end to a terminal clip 19 having spring arms 20 adapted to embrace and grip the rim terminal 21 of the lamp 10. The terminal clip 19 is mounted in, and carried by an insulating sleeve 22 adapted to fit snugly in the cavity of boss 9.

It will be seen that the installing of the instrument on the motor vehicle involves only the securement of the instrument upon a radiator cap and the connection of a battery terminal to the terminal 16 of the instrument. The current will then flow from the battery terminal through terminal 16, conductor 18, terminal clip 19, rim terminal 21, the filament of lamp 10, thence through the center contact of the lamp and closure 11 to ground.

Since the closure 11 is readily removable from the boss 9 and terminal clip 19 simply grips the lamp with yielding pressure, it is evident that a burned out lamp bulb may be readily replaced simply by unscrewing the plug 11, withdrawing the burned out bulb, and substituting a fresh one. To facilitate such replacement the lamp bulb is made of substantially no greater diameter than the lamp base, so that the bulb may be slid past the clip with the same facility as the base. The closure 11 is provided with a central recess 23 for reception of the center contact of the lamp 10. The inner face of the plug is beveled or concaved to cause the center contact to find this central recess and become seated in it as the plug is screwed home. The lamp is thus definitely centered and prevented from being jolted from side to side when the vehicle is in operation.

It will be observed that the lamp is cushioned longitudinally by the spring 12 and is cushioned laterally by the yieldable terminal clip arms 20 so that liability of destruction of the filament by jarring is reduced to a minimum.

While I have illustrated and described in detail certain preferred forms of my invention, it is to be understood that changes may be made therein within the scope of the appended claims and the invention embodied in other structures. I do not, therefore, desire to limit myself to the specific constructions illustrated, but intend to cover my invention broadly in whatever form its principle may be utilized.

I claim:

1. In a heat indicator, in combination, a thermometer having a transparent stem, a casing, a spring supported in alignment with said stem, a lamp including a bulb at one end and a center contact projection at the other end, and a closure insertable into the casing and engageable with the center contact for moving the lamp against the opposition of the spring; said closure having a central recess to receive the center contact.

2. In a heat indicator, in combination, a thermometer having a transparent stem, a casing, a spring supported in alignment with said stem, a lamp including a bulb at one end, and a center contact projection at the other end, and a plug insertable into the casing and engageable with the center contact for moving the lamp against the opposition of the spring, said plug having a central recess to receive the center contact, and having its surface surrounding the recess inclined toward the recess.

3. In a heat indicator, in combination, a thermometer having a transparent stem, a casing, an electric lamp having a bulb and a base, the base including center and rim terminals, a terminal clip in the casing adapted to engage the rim terminal, and a removable closure for the casing adapted to engage the center terminal, the lamp bulb being substantially of no larger cross section than the base so that the bulb portion of the lamp may be slid past the terminal clip with the same facility as the lamp base when the plug is withdrawn from the casing.

4. In a heat indicator, in combination, a thermometer having a transparent stem, a lamp, means housing the lamp in alignment with the thermometer stem, including a plug for making contact with the center of the lamp base, and a spring engaging the lamp bulb and urging the lamp toward said plug.

5. In a heat indicator, in combination, a thermometer having a transparent stem, a shield surrounding one end of said stem, a spring resting on the shield and embracing the end of the stem, and an electric lamp having the bulb portion thereof engaged by the spring and positioned by the spring in longitudinal alignment with the thermometer stem.

6. In a heat indicator for indicating the thermal condition of a vehicle motor, in combination, a thermometer having a transparent stem, a casing, an electric lamp mounted in the casing for illuminating the thermometer stem, said lamp including center and rim terminals, a spring supporting the lamp and pressing the center terminal into engagement with a portion of the casing, and a conductive spring clip embracing the rim terminal and serving as a lateral cushioning support for the lamp.

7. In a heat indicator adapted to be mounted on the radiator cap of a motor vehicle for indicating the thermal condition of the motor, in combination, a casing having an opening therethrough, a thermometer having the indicating portion of its stem mounted in said opening, and a dial cooperating with the thermometer and forming a background therefor, said dial being of skeleton form to avoid obstructing the passage of light through the opening of the casing.

In testimony whereof I have affixed my signature to this specification.

ALFRED B. SCHUPP.